United States Patent [19]

Mizuno et al.

[11] 4,425,493
[45] Jan. 10, 1984

[54] PULSE ARC WELDING MACHINE

[75] Inventors: Takaji Mizuno; Masanori Mizuno, both of Aichi; Hirotsugu Komura; Shigeo Ueguri, both of Hyogo; Youichiro Tabata, Hyogo, all of Japan

[73] Assignee: Mitsubishi Denki Kabushiki Kaisha, Tokyo, Japan

[21] Appl. No.: 281,530

[22] Filed: Jul. 8, 1981

[30] Foreign Application Priority Data

Jul. 8, 1980 [JP] Japan .................................. 55-93075

[51] Int. Cl.³ .............................................. B23K 9/09
[52] U.S. Cl. ........................... 219/130.51; 219/137 PS
[58] Field of Search ............ 219/130.51, 69 P, 137 PS

[56] References Cited

U.S. PATENT DOCUMENTS 3,902,037  8/1975  Goto et al. ...................... 219/130.51
4,237,370  12/1980  Ullmann ............................ 219/69 P

FOREIGN PATENT DOCUMENTS 2741322  3/1979  Fed. Rep. of Germany ........................ 219/130.51
52-17813  5/1977  Japan ................................ 219/130.51
52-73152  6/1977  Japan ................................ 219/130.51
54-40500  12/1979  Japan ................................ 219/130.51
6711853  3/1968  Netherlands ...................... 219/130.51

Primary Examiner—C. C. Shaw
Attorney, Agent, or Firm—Sughrue, Mion, Zinn, Macpeak, and Seas

[57] ABSTRACT

A pulse arc welding machine in which the repetition frequency of the pulse current is unaffected by the frequency of the power source and the mean value of the pulse current applied can be accurately controlled over a broad range while the arcing is maintained stable. A pulse peak current supplying circuit is connected in series with an arcing region formed between a consumable wire electrode and a material to be welded between the output terminals of a standard direct current source while a base current supplying circuit is connected in parallel with the pulse peak current supplying circuit. The pulse peak current supplying circuit and the base current supplying circuit are both composed of a switching element such as a transistor coupled in series with an inductive element. Diodes are provided for suppressing high voltage transients in the circuit.

4 Claims, 12 Drawing Figures

PULSE CURRENT

BASE CURRENT

ARC CURRENT

PEAK CURRENT

BASE CURRENT

ARC CURRENT $T_P > T_P'$

PULSE ARC WELDING MACHINE

BACKGROUND OF THE INVENTION

The present invention relates to a pulse arc welding machine. More specifically, the invention relates to a base current supplying source for a welding machine.

A conventional welding machine of this general type is shown in FIG. 1, in which reference numerals 1 and 2 designate a pulse current supplying source and a base current supplying source, respectively, the output terminals of which are connected in parallel and coupled to an arcing region (described later), 3 a consumable electrode wire, 4 a base material, and 5 an arcing region between the wire 3 and the base material.

FIGS. 2A–2C are graphs of the currents in the arcing region 5 in the welding machine in FIG. 1. The pulse current supplying source 1 operates to supply an electric current as shown in FIG. 2A. This current has a high peak value. During the pulse duration ($T_P$ in FIG. 2A), the end portion of the wire 3 is melted and shifted onto the base material 5 to perform the welding operation. During the pause period ($T_B$ in FIG. 2A), no current is supplied, and therefore it is impossible to maintain the arcing. That is, the arc is cut off, as a result of which the welding is unsatisfactory. In order to eliminate this difficulty, it is necessary to maintain the arcing even during the pause period. In order to meet the requirement, the base current supplying source 2 is connected in parallel to the pulse current supplying source 1 so that an electric current larger than that necessary for maintaining arcing in the arcing region 5 is supplied. With this arrangement, in addition to the base current, a current of high peak value is supplied by the pulse current supplying source 1, as shown in FIG. 2C, in order to maintain arcing so that, with the wire 3 set apart from the base material 4, the end portion of the wire is maintained molten and with the molten metal being shifted onto the base material 4.

FIG. 3 is a circuit diagram showing the welding machine in FIG. 1 more specifically. In FIG. 3, a circuit section 1, indicated by a one-dot chain line, corresponds functionally to the pulse current supplying source 1 in FIG. 1, and a circuit section 2 indicated by a dashed line to the base current supplying source 2. Further in FIG. 3, reference numerals 3, 4 and 5 designate a consumable electrode wire, an arcing region and a base material as in FIG. 1. Reference numeral 6 denotes a primary winding of a transformer; 7 an insulated secondary winding of the transformer; 8, 9 and 10 phase control elements connected to the balanced taps of the secondary winding 7; 11 a phase control element connected to the unbalanced taps of the secondary winding 7; and 12 an inductive element serving as a reactor for suppressing high voltage transients caused by abrupt changes of current. The base current value can be controlled by the ignition phases of the phase control elements 8, 9 and 10, and the pulse current value can be controlled by controlling the ignition phase of the phase control element 11.

As is apparent from FIGS. 1 and 3, the conventional pulse arc welding machine requires in addition to the pulse current supplying source 1 a second, entirely independent current source. That is, the welding machine requires the base current supplying source 2 besides the pulse current supplying source 1. Accordingly, the conventional pulse arc welding machine is disadvantageous in that it has an intricate construction and high manufacturing cost.

Furthermore, the conventional welding machine suffers from the difficulty that, since the repetition frequency of the pulse current is affected by the frequency of the power source, the range of welding current in which the optimum molten droplet transfer state can be obtained is limited, and sometimes it is difficult to employ the welding machine for welding specific materials.

In addition, in the conventional welding machine, although the mean value of the pulse current can be controlled, the instantaneous value thereof cannot be controlled. Therefore, the conventional welding machine suffers from the difficulty that if the arc load is varied, the instantaneous molten droplet transfer state is not uniform.

SUMMARY OF THE INVENTION

A primary object of the invention is thus to provide a pulse arc welding machine in which the pulse reptition frequency is not affected by the frequency of a power source.

Another object of the invention is to provide a pulse arc welding machine in which the peak value of a pulse current is maintained constant irrespective of the variations of an arc load, the arcing is maintained stable and is not affected by external disturbances, and the welding is improved in quality.

A further object of the invention is to provide a pulse arc welding machine in which switching elements can be readily controlled and in which welding can be carried out economically with less power consumption.

A still further object of the invention is to provide a pulse arc welding machine which can be readily combined with an existing DC source.

In accordance with these and other objects of the invention, there is provided a pulse arc welding machine including a direct current source, pulse peak current supplying circuit means, and base current supplying circuit means. The pulse peak current supplying circuit means is connected in series with an arcing region between an electrode and a material to be welded between the output terminals of the direct current source. The pulse peak current supplying circuit means includes a first switching element coupled to be operated by a first control signal for supplying a pulse peak current to the arcing region. The base current supplying circuit means includes a series circuit of a first inductive element and a second switching element coupled to be operated by a second control signal. The base current supplying circuit means is connected in parallel with the pulse peak current supplying circuit means and supplies a base current to the arcing region.

Preferably, the pulse peak current supplying circuit means further includes a second inductive element coupled in series with the first switching element. Also, first and second diodes may be provided with the first diode having a first terminal connected to a connecting point between the first switching element and the second inductive element in the pulse peak current supplying circuit means and with the second diode having a like first terminal, that is, the same as the anode or cathode terminal of the first diode, connected to a connecting point between the second switching element and the first inductive element in the base current supplying circuit means. The first and second diodes have second terminals connected to the material to be welded. In a preferred embodiment, the first and second switching elements are implemented with transistors.

DESCRIPTION OF THE PREFERRED EMBODIMENTS

Figure 4:
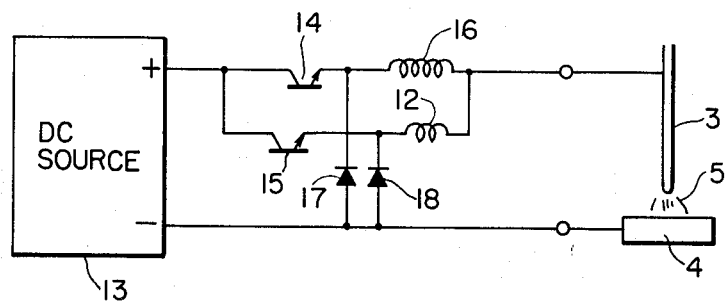
FIG. 4 is a circuit diagram, partly as a block diagram, showing an example of a pulse arc welding machine constructed according to the invention.

A preferred embodiment of a pulse current welding machine constructed according to the invention, as shown in FIG. 4, includes a DC source 13, switching elements 14 and 15 (which are transistors in this embodiment), inductance elements 12 and 16 which are connected to respective ones of the switching elements 14 and 15 for suppressing high voltage transients due to abrupt changes of current, and diodes 17 and 18 for circulating the currents which are produced by the reactive components of the inductance elements 12 and 16, etc. when the switching elements 14 and 15 are in the conductive state.

Figure 1:
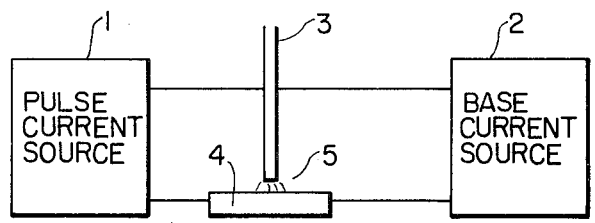
FIG. 1 is an explanatory diagram showing the arragement of a conventiona pulse arc welding machine.
Figure 2A:
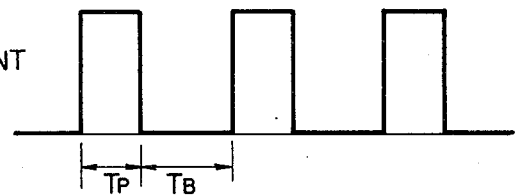
FIGS. 2A-2C are waveform diagrams showing currents employed in the wlding machine in FIG. 1.
Figure 2B:
Figure 2C:
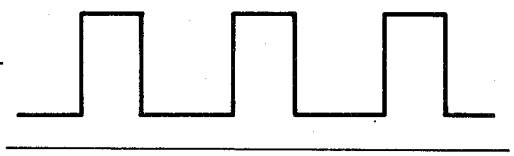
Figure 3:
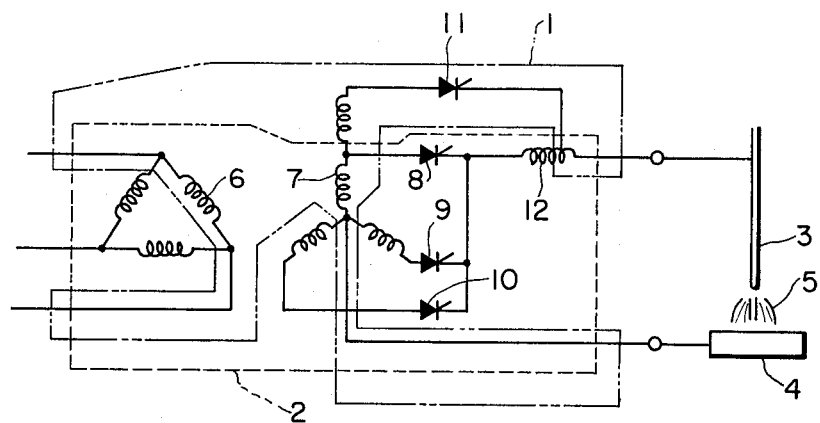
FIG. 3 is an explanatory diagram showing a specific example of power sources employed in the welding machine in FIG. 1.

Further in FIG. 4, reference numerals 3, 4 and 5 designate a consumable electrode wire, a base material and an arcing region, similar to FIGS. 1 and 3.

The operation of the welding maching thus constructed will be described. A pulse current supplying circuit is composed of the switching element 14, the inductive element 16, the electrode wire 3, the arcing region 5, and the base material 4, all of which are connected between the output terminals of the DC source 13 and the diode 17 which is connected in series with the switching element 14 and in parallel with a circuit composed of the inductive element 16, the electrode wire 3, the arcing region 5 and the base material 4.

Figure 5A:
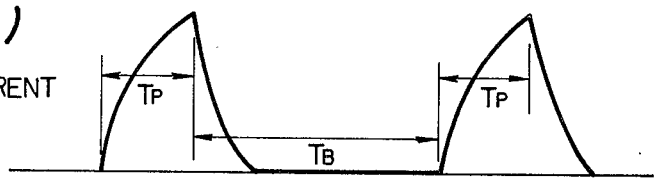
FIG. 5 is a waveform diagram showing currents employed in the welding machine in FIG. 4.

When the switching element 14 is closed, current flows from the positive terminal of the DC source 13 to the switching element 14, the inductive element 16, the consumable electrode wire 3, the arcing region 5, the base material 4 and back to the negative terminal of the DC source 13. When the switching element 14 is opened, the current flows in a closed path including the inductive element 16, the wire 3, the arcing region 5, the base material 4, the diode 17, and back to the inductive element 16 until the current due to the inductive components in the circuit dies out as the magnetic energy which was stored in the inductive element 16 is consumed. Thus, a current as shown in FIG. 5A is supplied to the arcing region 5 by repeatedly closing and opening the switching element 14. As the pulse current should have a steep peak current waveform, the provision of the inductive element 16 is not always required.

A base current supplying circuit is made up of a circuit composed of the switching element 15, the inductive element 12, the electrode wire 3, the arcing region 5 and the base material 4, all of which are connected between the output terminals of the DC source 13, and the diode 18 which is connected in series with the switching element 15 and in parallel with a circuit composed of the inductive element 12, the electrode wire 3, the arcing region 5 and the base material 4.

Figure 5B:
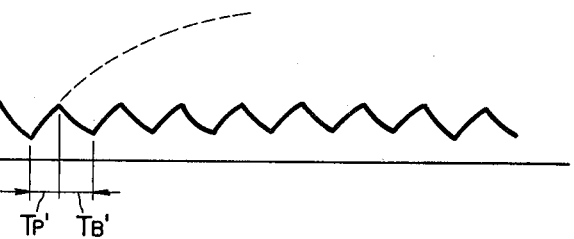
Figure 5C:
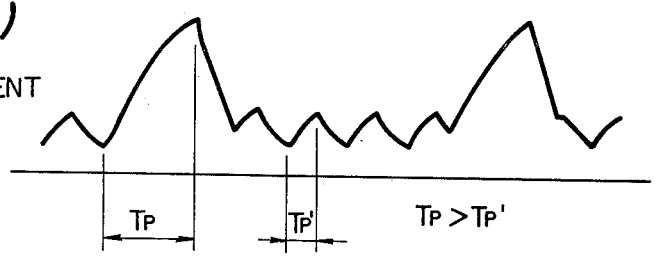

The fundamental operation of this base current supplying circuit is similar to that of the pulse current supplying circuit with the switching element 14 replaced by the switching element 15, the inductive element 16 by the inductance element 12 and the diode 17 by the diode 18 in the above described description. However, it should be noted that a specific feature of the base current supplying circuit resides in that, in order to maintain arcing without positively melting the electrode wire, i.e. in order for the base current to meet the requirements stated above, the switching element 15 is operated (opened and closed) in such a manner that the closure period of the switching element 15 is shorter than that of the switching element 14. Accordingly, as shown in FIG. 5B, the peak value of the base current is lower than that of the pulse current.

Figure 6:
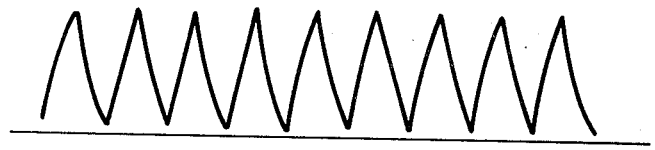
FIG. 6 is a waveform diagram showing a base current which is too high in ripple factor for practical use.

The provision of the inductive element 12 is necessary to prevent excessive pulsation of the base current due to a delay in the operation of the switching element 15. If the inductive element 12 were removed from the circuit, then the welding current waveform would be as shown in FIG. 6, and accordingly it would be impossible to maintain arcing. The arc can be maintained by increasing the switching frequency. However, in this case, the welding device would be considerably expensive in manufacturing cost.

In the above-described embodiment of a pulse arc welding machine, the switching element 15 is operated at a constant frequency to generate the base current. However, the base current can be generated by detecting the base current value, and when the base current value reaches a predetermined upper limit value, opening the switching element 15 and, when it reaches a predetermined lower limit value, closing the switching element 15.

As described above, according to the invention, a series circuit of the second switching element 15 and the inductance element 12 is connected in parallel with the first switching element 14 connected to the DC source 13 and in series with the arcing region 5 so that the DC source can be used commonly for the base current supplying circuit and the pulse current supplying current. Accordingly, in the welding machine of the invention, unlike a conventional welding machine of this type, it is unnecessary to provide a separate base current supplying soruce in addition to the pulse current supplying source. Accordingly, the welding machine of the invention has a simple construction and low manufacturing cost. In addition, no special power source is necessary, and the welding machine of the invention can be readily operated from a standard DC source.

Figure 7A:
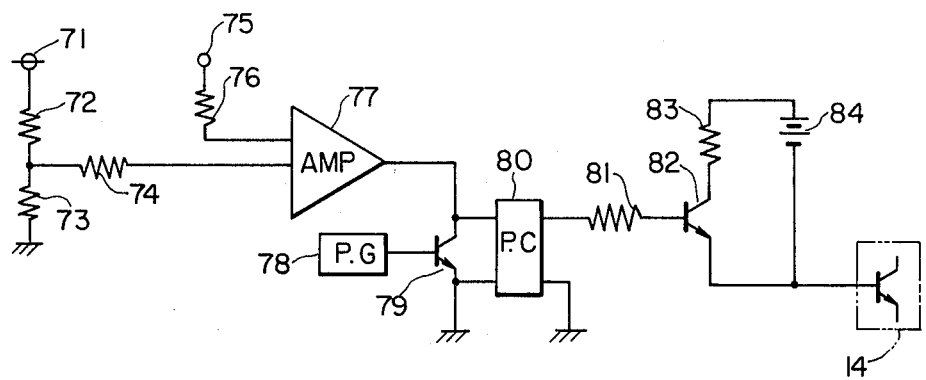
FIG. 7A is a circuit diagram of a control circuit for a first switching element shown in the circuit of FIG. 4.

Shown in FIG. 7A is an example of a control circuit for controlling an operation of the first switching element 14. In FIG. 7A, a peak value of a pulse current is determined by a power source 71 and resistors 72 and 73. The thus determined peak value is compared with a pulse peak value of a pulse current flowing through the switching element 14 supplied from a terminal 75 through a resistor 76 by a comparison amplifier 77. The amplifier 77 operates to produce an output when a difference between the detected peak value and the predetermined peak value occurs. A pulse generator 78 operates to control an on-off operation of a switching transistor 79. In this arrangement, the frequency of pulse current which is supplied to the arcing region 5 is determined in accordance with the output frequency of the pulse generator 78.

Designated by reference numeral 80 is a photocoupler which is connected to the switching transistor 79 to accomplish electorical isolation. Reference numeral 82 designates a driving transistor for the first switching element 14, which is controlled in accordance with the output signal of the photocoupler 80. A power supply 84 is provided for supplying power to the switching element 14.

In the control circuit shown in FIG. 7A, the pulse current flowing through the first switching element 14 is controlled so that its peak value is a predetermined value wherein the pulse current supplied to the arcing region 5 is controlled with a frequency determined by the pulse generator 78. Accordingly, the on-off operation of the switching element 14 is thus controlled as a result of which a current having a waveform as shown in FIG. 5A is supplied to the arcing region 5.

Figure 7B:
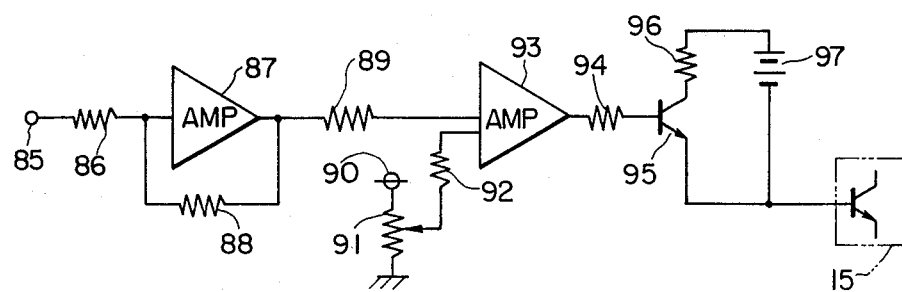
FIG. 7B is a circuit diagram of a control circuit for a second switching element shown in the circuit of FIG. 4.

FIG. 7B is a circuit diagram showing an example of a control circuit for controlling an on-off operation of the second switching element 15. The base current of the second switching element 15 is applied to an input terminal 85 and it is then amplified by an amplifier 87. The output of the amplifier 87 is compared with a value determined by a power source 90, a variable resistor 91 and a resistor 92 by a comparison amplifier 93. The amplifier 93 operates to produce an output when the determined value is larger than the output of the amplifier 87. The output of the amplifier 93 is used as a control signal for an on-off operation of a transistor 95 which is employed as a driving element for the second switching element 15. Reference numeral 97 designates a driving power source for the switching element 15.

In the control circuit shown in FIG. 7B, the base current of the switching element 15 is controlled so as to be equal to the value determined by the power source 90 and the resistors 90 and 91. As a result, a current having a waveform shown in FIG. 5B is supplied to the arcing region 5.

What is claimed is:

1. A pulse arc welding machine comprising:
   a single direct current source;
   pulse peak current supplying circuit means connected in series with an arcing region between an electrode and a material to be welded between output terminals of said single direct current source, said pulse peak current supplying circuit means comprising a series circuit of a first inductive element and a first switching element coupled to be operated by a first control signal for supplying a pulse peak current to said arcing region; and
   base current supplying circuit means connected in parallel with said pulse peak current supplying circuit means and being supplied input current from only said single direct current source, said base current supplying circuit means comprising a series circuit of a second inductive element and a second switching element coupled to be operated by a second control signal for supplying base current to said arcing region for sustaining an arc in said arcing region between pulses of said pulse peak current.

2. The welding machine as claimed in claim 1, further comprising a first diode having a first terminal connected to a connecting point between said first switching element and said first inductive element in said pulse peak current supplying circuit means and a second diode have a like first terminal connected to a first connecting point between said second switching element and said second inductive element in said base current supplying circuit means, said first and second diode having second terminals connected to said material to be welded.

3. The welding machine as claimed in claim 2, wherein said first and second switching elements comprises transistors.

4. A pulse arc welding machine comprising: a direct current source; a first transistor having a collector coupled to a positive output terminal of said direct current source; a first inductor having a first terminal coupled to an emitter of said first transistor and a second terminal adapted to be connected to a consumable wire electrode; means for connecting a negative output terminal of said direct current source to a material to be welded, wherein an arcing region is formed between an end of said consumable wire electrode and said material to be welded; a second transistor having a collector coupled to said positive output terminal of said direct current source; a second inductive element having a first terminal coupled to an emitter of said second transistor and a second terminal coupled to said second terminal of said first inductive element; a first diode having a cathode terminal coupled to said emitter of said first transistor and an anode terminal coupled to said negative output terminal of said direct current source; a second diode having a cathode terminal coupled to said emitter of said second transistor and an anode terminal coupled to said negative output terminal of said direct current source; first driving means coupled to a base of said first transistor for driving said first transistor for supplying a pulse peak current to said arcing region; and second driving means coupled to a base of said second transistor for driving said second transistor for supplying a base current to said arcing region.

* * * * *